United States Patent
Hsu (10) Patent No.: US 11,144,169 B2
(45) Date of Patent: Oct. 12, 2021

(54) ELECTROMAGNETIC INDUCTION TYPE COORDINATE POSITIONING APPARATUS

(71) Applicant: Shenzhen Pu Ying Innovation Technology Corp., LTD., Shenzhen (CN)

(72) Inventor: Chung-Wen Hsu, Shenzhen (CN)

(73) Assignee: Shenzhen Pu Ying Innovation Technology Corp., LTD., Shenzhen (CN)

( * ) Notice: Subject to any disclaimer, the term of this patent is extended or adjusted under 35 U.S.C. 154(b) by 0 days.

(21) Appl. No.: 17/182,986

(22) Filed: Feb. 23, 2021

(65) Prior Publication Data

US 2021/0278916 A1  Sep. 9, 2021

(30) Foreign Application Priority Data

Mar. 6, 2020 (CN) .......................... 202010151244.5

(51) Int. Cl.
*G06F 3/046* (2006.01)
*G06F 3/038* (2013.01)
*G06F 3/0354* (2013.01)

(52) U.S. Cl.
CPC .............. *G06F 3/046* (2013.01); *G06F 3/038* (2013.01); *G06F 3/0354* (2013.01)

(58) Field of Classification Search
CPC ............................ G06F 3/03545; G06F 3/046
USPC .................... 345/174, 179; 178/18.07, 19.01
See application file for complete search history.

(56) References Cited

U.S. PATENT DOCUMENTS

| 5,434,372 | A | * | 7/1995 | Lin | .......................... G06F 3/046 |
| | | | | | 178/18.07 |
| 5,751,229 | A | * | 5/1998 | Funahashi | ........... G06F 3/03545 |
| | | | | | 178/18.05 |
| 7,176,907 | B2 | * | 2/2007 | Chao | ....................... G06F 3/046 |
| | | | | | 178/18.07 |

FOREIGN PATENT DOCUMENTS

| CN | 101572555 A | 11/2009 |
| TW | I304559 B | 12/2008 |

* cited by examiner

*Primary Examiner* — Koosha Sharifi-Tafreshi
(74) *Attorney, Agent, or Firm* — Rabin & Berdo, P.C.

(57) ABSTRACT

An electromagnetic induction type coordinate positioning apparatus includes a first induction coil, a second induction coil, a first signal processing circuit, a second signal processing circuit, and a control circuit. The first induction coil and the second induction coil respectively generate a first induction signal and a second induction signal when a pointer device comes close. The first signal processing circuit performs a first signal processing procedure on one of the first induction signal and the second induction signal. The second signal processing circuit performs a second signal processing procedure on the other one of the first induction signal and the second induction signal. The control circuit calculates position information of the pointer device according to the first induction signal and the second induction signal that have been respectively processed by the first signal processing procedure and the second signal processing procedure.

10 Claims, 7 Drawing Sheets

ELECTROMAGNETIC INDUCTION TYPE COORDINATE POSITIONING APPARATUS

CROSS-REFERENCE TO RELATED APPLICATION

This non-provisional application claims priority under 35 U.S.C. § 119(a) to Patent Application No. 202010151244.5 filed in China, P.R.C. on Mar. 6, 2020, the entire contents of which are hereby incorporated by reference.

BACKGROUND

Technical Field

The present disclosure relates to a coordinate positioning apparatus, and more particularly to an electromagnetic induction type coordinate positioning apparatus.

Related Art

A conventional electromagnetic induction type coordinate positioning apparatus scans with one induction coil each time to determine the position of a pointer device, that is, sequentially uses different induction coils for scanning to determine the position of the pointer device. However, a long scan time is required for multiple induction coils once at one by one scanning, that is, the conventional scanning method has a low scanning speed, the electromagnetic induction type coordinate positioning apparatus cannot quickly determine the position of the pointer device, and the coordinate report rate cannot be improved. In addition, as each time only scan one induction coil for calculating the coordinates of the pointer device, the induction signals used for calculating the coordinates are captured at different time slots. That is, the coordinates of the pointer device cannot be calculated accurately due to the pointer device is moved slightly between the different time slots is not considered.

Moreover, in a passive pointer device, the pointer device has to harvest and store the electric energy from the electromagnetic induction type coordinate positioning apparatus, then the pointer device may in operating. However, the electric energy harvesting efficiency of the electromagnetic induction type coordinate positioning apparatus is often limited by the analog switches used in the electromagnetic induction type coordinate positioning apparatus. A single analog switch cannot withstand a large current, resulting in that the electric energy harvest restriction of the pointer device from the electromagnetic induction type coordinate positioning apparatus, that is, leading to low power harvesting efficiency of the pointer device.

Further, the conventional electromagnetic induction type coordinate positioning apparatus communicates with the pointer device at a single predefined operating frequency, and when the noise with the predefined operating frequency exists in the environment where electromagnetic induction type coordinate positioning apparatus is located, the operation of the electromagnetic induction type coordinate positioning apparatus is interfered, reducing the product performance of the electromagnetic induction type coordinate positioning apparatus, or even leading to malfunction of the electromagnetic induction type coordinate positioning apparatus.

SUMMARY

The present disclosure provides an electromagnetic induction type coordinate positioning apparatus, including a first induction coil, a second induction coil, a first signal processing circuit, a second signal processing circuit, and a control circuit. The first induction coil is configured to generate a first induction signal when a pointer device comes close. The second induction coil and the first induction coil are arranged in an interlaced arrangement along an axial direction. The second induction coil is configured to generate a second induction signal when the pointer device comes close. The first signal processing circuit is coupled to the first induction coil and the second induction coil. The first signal processing circuit is configured to electrically connect to one of the first induction coil and the second induction coil, to perform a first signal processing procedure on one of the first induction signal and the second induction signal. The second signal processing circuit is coupled to the first induction coil and the second induction coil. The second signal processing circuit is configured to electrically connect to one of the first induction coil and the second induction coil, to perform a second signal processing procedure on the other one of the first induction signal and the second induction signal. The control circuit is coupled to the first signal processing circuit and the second signal processing circuit. The control circuit is configured to receive the first induction signal and the second induction signal that have been respectively processed by the first signal processing procedure and the second signal processing procedure, and calculates position information of the pointer device.

DETAILED DESCRIPTION

Figure 1:
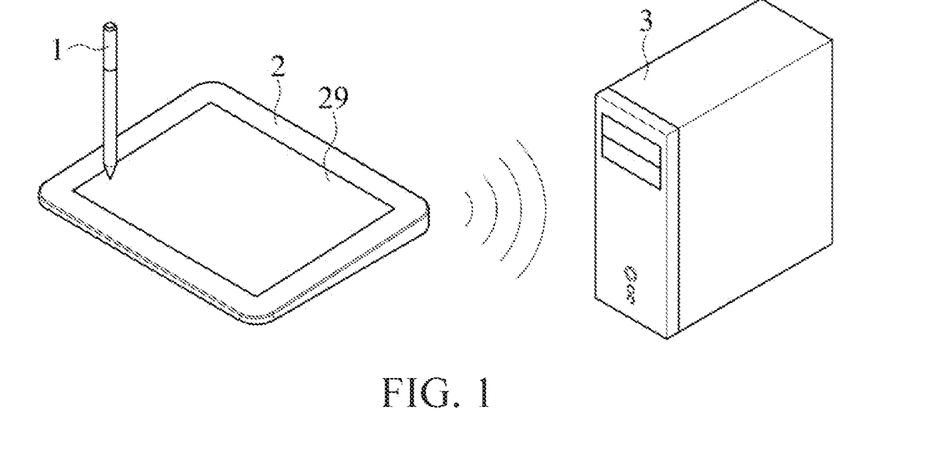
FIG. 1 is a diagram of an embodiment of an electromagnetic induction type coordinate positioning apparatus of the present disclosure and an embodiment of a pointer device 1 applicable to the electromagnetic induction type coordinate positioning apparatus.
Figure 2:
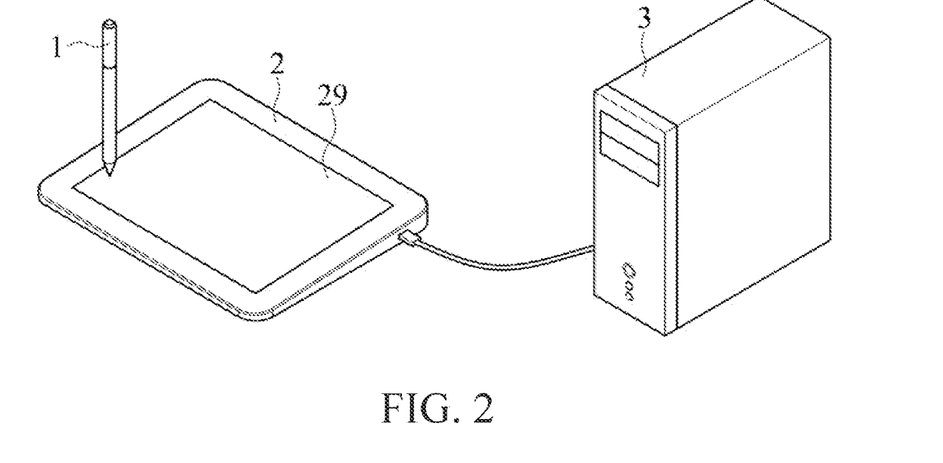
FIG. 2 is a diagram of an embodiment of an electromagnetic induction type coordinate positioning apparatus of the present disclosure and another embodiment of a pointer device applicable to the electromagnetic induction type coordinate positioning apparatus.

FIG. 1 and FIG. 2 are diagrams of an embodiment of an electromagnetic induction type coordinate positioning apparatus 2 of the present disclosure and an embodiment of a pointer device 1 applicable to the electromagnetic induction type coordinate positioning apparatus 2. Referring to FIG. 1 and FIG. 2, the electromagnetic induction type coordinate positioning apparatus 2 includes a working area 29. The pointer device 1 may or may not contact with the working area 29 of the electromagnetic induction type coordinate positioning apparatus 2. When the position of the pointer device 1 is close to the working area 29, the electromagnetic induction type coordinate positioning apparatus 2 may sense an induction signal of the pointer device 1, and receive a signal sent by the pointer device 1. When the pointer device 1 is in contact with the electromagnetic induction type coordinate positioning apparatus 2, the electromagnetic induction type coordinate positioning apparatus 2 may further receive a pressure signal from the pointer device 1. In addition, as shown in FIG. 1 and FIG. 2, the electromagnetic induction type coordinate positioning apparatus 2 may communicate with another electronic device 3 in a wired or wireless manner. In an embodiment, the electromagnetic induction type coordinate positioning apparatus 2 may be a writing tablet, a mobile phone, a tablet computer, a notebook computer, a digital tablet, or a smart notebook. The pointer device 1 may be an electromagnetic induction type stylus, mouse, or a puck. The electronic device 3 may be a mobile phone, a tablet computer, or a notebook computer.

Figure 3:
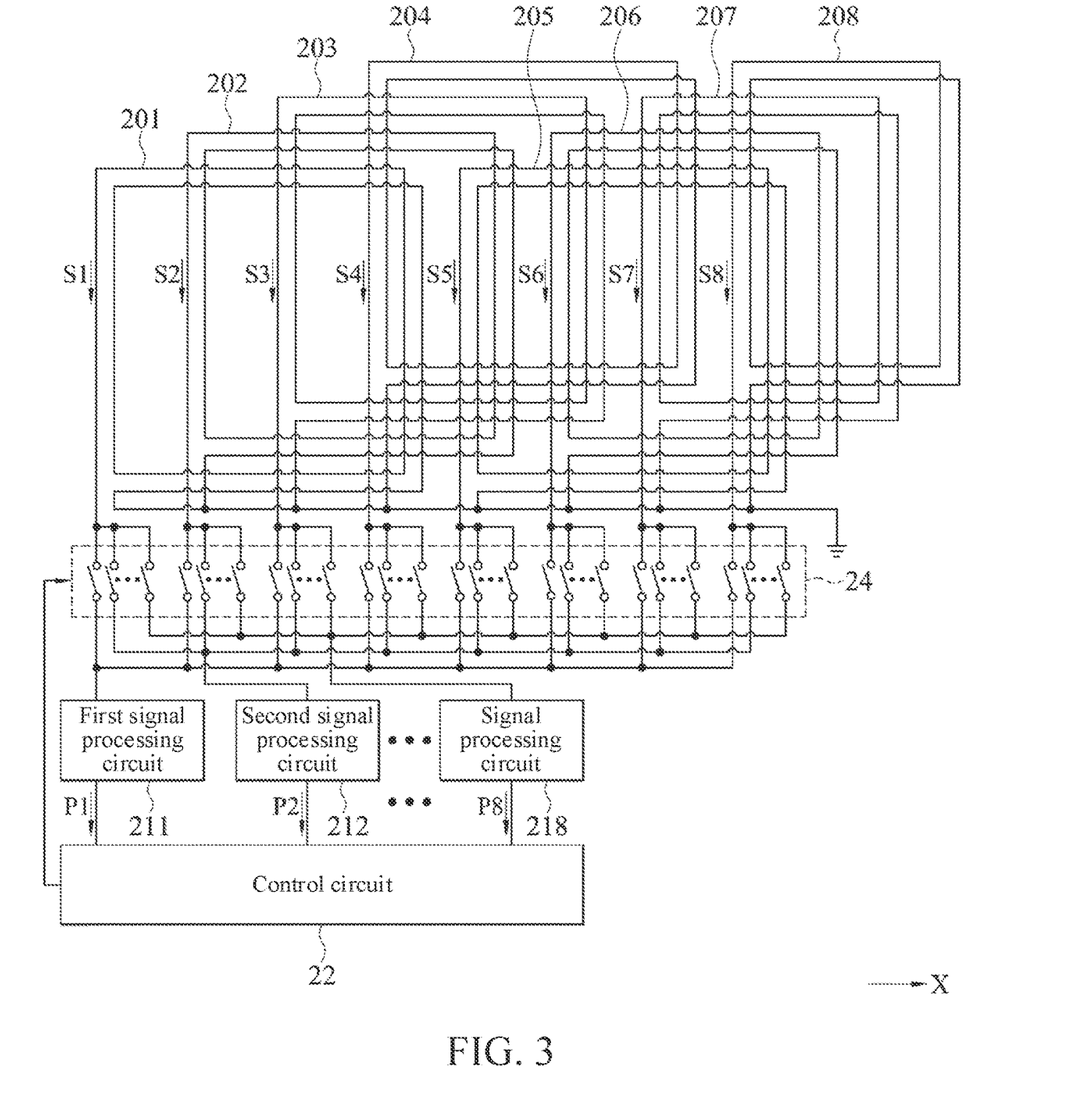
FIG. 3 is a schematic circuit diagram of an embodiment of the electromagnetic induction type coordinate positioning apparatus of FIG. 1.

FIG. 3 is a diagram of an embodiment of the electromagnetic induction type coordinate positioning apparatus 2 of FIG. 1. Referring to FIG. 3, the electromagnetic induction type coordinate positioning apparatus 2 includes a plurality of induction coils 201-208, a selection circuit 24, a plurality of signal processing circuits 211-218, and a control circuit 22. FIG. 3 shows an example where the number of induction coils is 8. In terms of configuration, the induction coils 201-208 are arranged along the same axial direction (for example, X axis or Y axis), and every two adjacent induction coils are arranged in an interlaced arrangement. For example, two adjacent induction coils 201 and 202 are arranged in an interlaced arrangement, two adjacent induction coils 202 and 203 are arranged in an interlaced arrangement, and so on.

A plurality of induction coils in the induction coils 201-208 may synchronously be coupled the induction signals of the pointer device 1. When the pointer device 1 is put near the electromagnetic induction type coordinate positioning apparatus 2, the induction signals may be inducted respectively between the adjacent induction coils according to the position of the pointer device 1, that is, a plurality of induction coils in the induction coils 201-208 may be inducted the induction signals at the same time. adjacent For example, when the pointer device 1 is close to the induction coil 201, the induction coil 202 and the induction coil 201 adjacent to each other may respectively be inducted the induction signals S2 and S1, the induction signals S1 and S2 having different voltage levels. When the pointer device 1 is close to the induction coil 202, the induction coils 201 and 203 and the induction coil 202 adjacent to each other may respectively be inducted induction signals S1, S3, and S2, the induction signals S1, S3, and S2 having different voltage levels. In addition, when the position of the pointer device 1 is close to the induction coil 205, the induction coils 204 and 206 adjacent to the induction coil 205, and the induction coil 205 may respectively be inducted induction signals S4, S6, and S5, the induction signals S4, S6, and S5 having different voltage levels. The rest can be deduced by analogy, so the details will not be described herein. In an embodiment, for each the induction coils 201-208 may be multi-wound coils. FIG. 3 shows an example in which the induction coils 201-208 are wired in two wound.

In an embodiment, because a plurality of induction coils in the induction coils 201-208 may be inducted the induction signals at the same time, the number of signal processing circuits is at least two. FIG. 3 shows eight signal processing circuits 211-218 as an example. Moreover, it should be noted that the number of signal processing circuits may be the same as or different from the number of induction coils. Assuming that the two numbers are the same, when the number of induction coils is N, the number of signal processing circuits is also N. For example, the number of induction coils is 8 (that is, N is 8), the number of signal processing circuits is also 8. Assuming that the two numbers are different, if the number of induction coils is 8, the number of signal processing circuits may be 5, less than 5, or greater than 5.

The signal processing circuits 211-218 are coupled to each of the induction coils 201-208. To be specific, the signal processing circuit 211 is coupled to each of the induction coils 201-208, the signal processing circuit 212 is coupled to each of the induction coils 201-208, and so on. The selection circuit 24 is coupled between the induction coils 201-208 and the signal processing circuits 211-218. As switched by the selection circuit 24, the signal processing circuits 211-218 may be selectively electrically connected to the induction coils 201-208, and when the eight induction coils 201-208 synchronously be coupled the induction signals of the pointer device 1, each of the signal processing circuits 211-218 may be synchronously electrically connected to one of the induction coils 201-208.

For example, in an example where the eight induction coils 201-208 synchronously be coupled the induction signals of the pointer device 1, in an embodiment, the signal processing circuits 211-218 are respectively electrically connected to the induction coils 201-208; in another embodiment, the signal processing circuit 213-218 are respectively electrically connected to the induction coils 201-206, the signal processing circuit 211 is electrically connected to the induction coil 208, and the signal processing circuit 212 is electrically connected to the induction coil 207. The rest can be deduced by analogy, so the details will not be described herein. In other embodiments, there may be less than eight induction coils synchronously be coupled the induction signals of the pointer device 1, for example, six adjacent induction coils 202-207 synchronously be coupled the induction signals of the pointer device 1, or four adjacent induction coils 205-208 synchronously be coupled the induction signals of the pointer device 1. The rest can be deduced by analogy, so the details will not be described herein.

Figure 4:
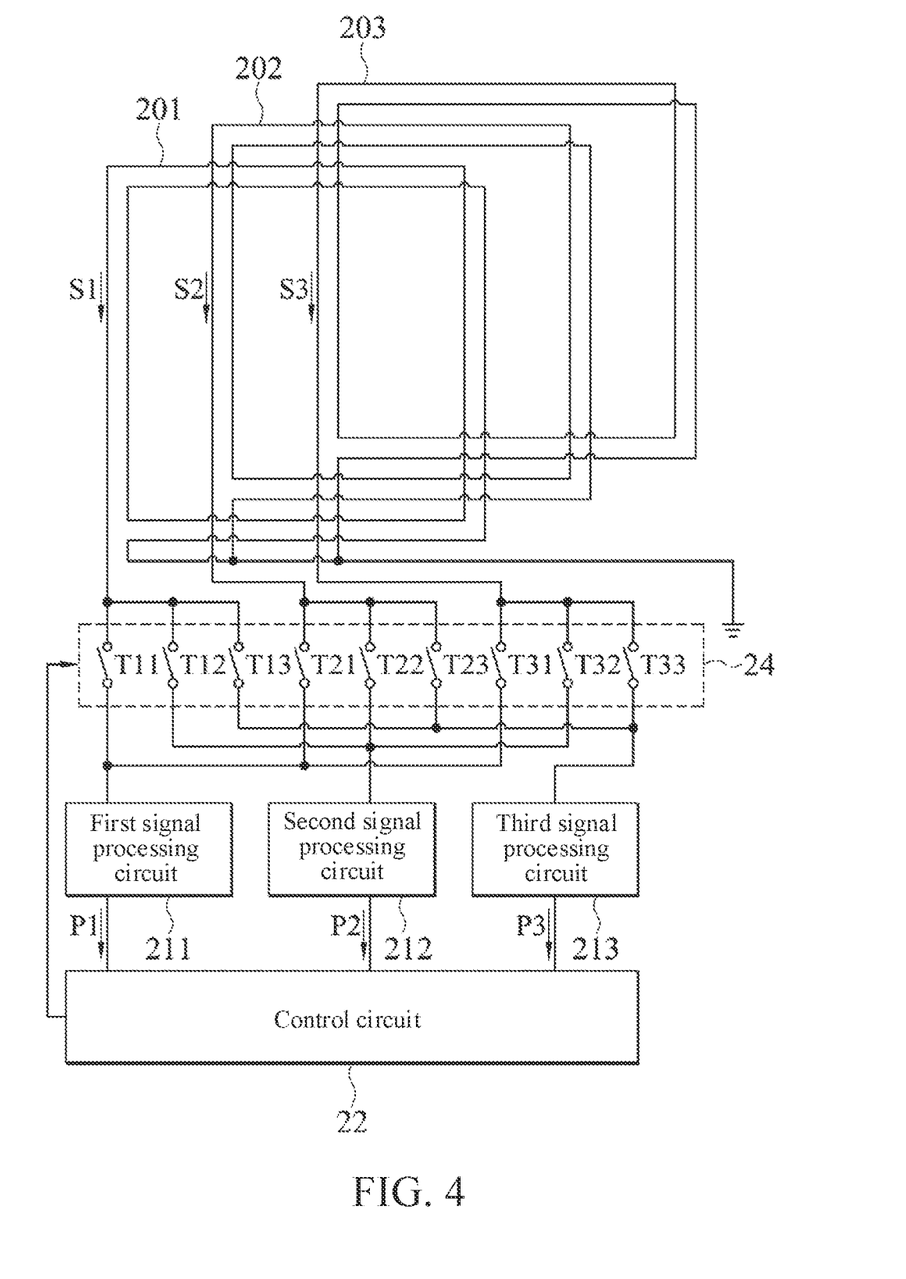
FIG. 4 is a part of circuit diagram of an embodiment of the electromagnetic induction type coordinate positioning apparatus of FIG. 3.

For the brevity of description, the following uses an example where at least two induction coils 201 and 202 in the eight induction coils 201-208 synchronously be coupled the induction signals of the pointer device 1 to generate a plurality of induction signals at the same time. Referring to FIG. 4, FIG. 4 shows three adjacent induction coils 201-203 (hereinafter referred to as a first induction coil 201, a second induction coil 202, and a third induction coil 203 respectively for the convenience of description) in the eight induction coils 201-208 and three signal processing circuits 211-213 (hereinafter referred to as a first signal processing circuit 211, a second signal processing circuit 212, and a third signal processing circuit 213 respectively) in the eight signal processing circuits 211-218.

As switched by the selection circuit 24, when the induction coils 201-202 synchronously be coupled the induction signals of the pointer device 1, the first signal processing circuit 211 is electrically connected to one of the first induction coil 201 and the second induction coil 202, the second signal processing circuit 212 is electrically connected to the other one of the first induction coil 201 and the second induction coil 202. For example, the first signal processing circuit 211 is electrically connected to the first induction coil 201 and the second signal processing circuit 212 is electrically connected to the second induction coil 202, or when the first signal processing circuit 211 is electrically connected to the second induction coil 202 and the second signal processing circuit 212 is electrically connected to the first induction coil 201.

Therefore, when the first signal processing circuit 211 is electrically connected to the first induction coil 201 and the second signal processing circuit 212 is electrically connected to the second induction coil 202 (hereinafter referred to as a first connection mode), the first induction coil 201 and the second induction coil 202 generate induction signals S1 and S2 at the same time. A first induction signal S1 generated by the first induction coil 201 may be transferred to the first signal processing circuit 211 through the selection circuit 24. A second induction signal S2 generated by the second induction coil 202 may be transferred to the second signal processing circuit 212 through the selection circuit 24. The first signal processing circuit 211 and the second signal processing circuit 212 may respectively perform a signal processing procedure on the first induction signal S1 and the second induction signal S2. The first signal processing circuit 211 outputs, according to the first induction signal S1, a signal P1 obtained after signal processing to the control circuit 22. The second signal processing circuit 212 outputs, according to the second induction signal S2, a signal P2 obtained after signal processing to the control circuit 22. The control circuit 22 then calculates the position of the pointer device 1 according to the signal P1 obtained after signal processing and the signal P2 obtained after signal processing.

In another case, when the first signal processing circuit 211 is electrically connected to the second induction coil 202 and the second signal processing circuit 212 is electrically connected to the first induction coil 201 (hereinafter referred to as a second connection mode), a first induction signal S1 generated by the first induction coil 201 may be transferred to the second signal processing circuit 212 through the selection circuit 24, and a second induction signal S2 generated by the second induction coil 202 may be transferred to the first signal processing circuit 211 through the selection circuit 24. The first signal processing circuit 211 and the second signal processing circuit 212 may respectively perform a signal processing procedure on the second induction signal S2 and the first induction signal S1. The first signal processing circuit 211 outputs, according to the second induction signal S2, a signal P1 obtained after signal processing to the control circuit 22. The second signal processing circuit 212 outputs, according to the first induction signal S1, a signal P2 obtained after signal processing to the control circuit 22. The control circuit 22 then calculates the position of the pointer device 1 according to the signal P1 obtained after signal processing and the signal P2 obtained after signal processing.

Further, when the induction coils 201, 202, and 203 synchronously be coupled the induction signals of the pointer device 1, the induction coils 201, 202, and 203 may be coupled the induction signals S1, S2, and S3 at the same time. In a first embodiment, the first signal processing circuit 211 is electrically connected to the first induction coil 201, the second signal processing circuit 212 is electrically connected to the second induction coil 202, and the third signal processing circuit 213 is electrically connected to the third induction coil 203. In a second embodiment, the first signal processing circuit 211 is electrically connected to the third induction coil 203, the second signal processing circuit 212 is electrically connected to the first induction coil 201, and the third signal processing circuit 213 is electrically connected to the second induction coil 202. In a third embodiment, the first signal processing circuit 211 is electrically connected to the second induction coil 202, the second signal processing circuit 212 is electrically connected to the third induction coil 203, and the third signal processing circuit 213 is electrically connected to the first induction coil 201. The rest can be deduced by analogy, so the details will not be described herein. Based on this, in the foregoing three embodiments, the control circuit 22 then calculates the position of the pointer device 1 according to signals P1, P2, and P3 obtained after signal processing.

Based on this, when the pointer device 1 is close to the electromagnetic induction type coordinate positioning apparatus 2, the electromagnetic induction type coordinate positioning apparatus 2 may use a plurality of induction coils in the induction coils 201-208 to synchronously be coupled the induction signals of the pointer device 1. As compared with the prior art, the use of a plurality of induction coils to synchronously be coupled can speed up the process of inducting the induction signals of the pointer device 1, thereby improving the report rate of the position information of the pointer device 1. In addition, as compared with the prior art where only one single induction coil is used at a time to sequentially induct the induction signals coupled by the induction coils, adjacent two induction coils in the induction coils 201-208 couple a plurality of induction signals at the same time, and different induction signals are different strengths, which show the relative positions of the plurality of induction coils respectively. Therefore, the position information of the pointer device 1 calculated by the control circuit 22 has high accuracy.

In an embodiment, as shown in FIG. 3, in the foregoing example where N is 8, the electromagnetic induction type coordinate positioning apparatus 2 further includes eight selection circuits 24, and the eight selection circuits 24 are respectively connected to different induction coils 201-208. In addition, the selection circuits 24 connected to the different induction coils 201-208 each include eight selectors. FIG. 3 only shows some selectors of the selection circuits 24. The selectors may be implemented by analog switches. In an example where the selectors are analog switches and the eight induction coils 201-208 synchronously couple the signals of the pointer device 1, the selection circuits 24 connected to the different induction coils 201-208 may be turned on at the same time, and in the eight analog switches in each selection circuit 24, only one analog switch is turned on, and the remaining analog switches are all turned off, so that each of the signal processing circuits 211-218 is electrically connected to one of the induction coils 201-208 in a one-to-one correspondence.

In particular, as shown in FIG. 4, FIG. 4 shows three analog switches in each of the selection circuits 24 respectively connected to the induction coils 201-203: T11, T12, T13, T21, T22, T23, T31, T32, and T33. Using the analog switches T11, T12, T21, and T22 (hereinafter referred to as a first analog switch T11, a second analog switch T12, a third analog switch T21, and a fourth analog switch T22) as an example, the first analog switch T11 is connected between the first induction coil 201 and the first signal processing circuit 211, and the second analog switch T12 is connected between the first induction coil 201 and the second signal processing circuit 212. The first analog switch T11 may receive the first induction signal S1, and transfer the first induction signal S1 to the first signal processing circuit 211.

The second analog switch T12 may also receive the first induction signal S1, and transfer the first induction signal S1 to the second signal processing circuit 212. The first analog switch T11 and the second analog switch T12 are selectively turned on to transmit the first induction signal S1 to one of the first signal processing circuit 211 and the second signal processing circuit 212.

Similarly, the third analog switch T21 is connected between the second induction coil 202 and the first signal processing circuit 211, and the fourth analog switch T22 is connected between the second induction coil 202 and the second signal processing circuit 212. The third analog switch T21 may receive the second induction signal S2, and transfer the second induction signal S2 to the first signal processing circuit 211. The fourth analog switch T22 may also receive the second induction signal S2, and transfer the second induction signal S2 to the second signal processing circuit 212. The third analog switch T21 and the fourth analog switch T22 are turned on one of these two analog switches, the first analog switch T11 and the third analog switch T21 are turned on one of these two analog switches, and the second analog switch T12 and the fourth analog switch T22 are turned on one of these two analog switches. In other words, when the first analog switch T11 is turned on, the fourth analog switch T22 may be turned on, and the third analog switch T21 cannot be turned on. The first analog switch T11 transmits the first induction signal S1 to the first signal processing circuit 211. The fourth analog switch T22 transmits the second induction signal S2 to the second signal processing circuit 212. When the second analog switch T12 is turned on, the third analog switch T21 may be turned on, and the fourth analog switch T22 cannot be turned on. The second analog switch T12 transmits the first induction signal S1 to the second signal processing circuit 212. The third analog switch T21 transmits the second induction signal S2 to the first signal processing circuit 211.

Based on this, in the foregoing first connection mode, the control circuit 22 generates a first control signal. Take it as an example that the first control signal has four bits which respectively control the analog switches T11, T12, T21, and T22 from the most significant bit (MSB) to the lowest significant bit (LSB). If the first control signal is 4b1001, the control signal S1 controls the first analog switch T11 to be turned on, the second analog switch T12 to be turned off, the third analog switch T21 to be turned off and the fourth analog switch T22 to be turned on. That means the first analog switch T11 and the fourth analog switch T22 are both turned on, so that the first analog switch T11 transmits the first induction signal S1 to the first signal processing circuit 211, and the fourth analog switch T22 transmits the second induction signal S2 to the second signal processing circuit 212. In addition, in the foregoing second connection mode, the control circuit 22 generates a second control signal. Take it as an example that the second control signal has four bits which respectively control the analog switches T11, T12, T21, and T22 from the most significant bit (MSB) to the lowest significant bit (LSB). If the second control signal is 4'b0110, the second control signal controls the first analog switch T11 to be turned off, the second analog switch T12 to be turned on, the third analog switch T21 to be turned on and the fourth analog switch T22 to be turned off. That means the second analog switch T12 and the third analog switch T21 are both turned on, so that the second analog switch T12 transmits the first induction signal S1 to the second signal processing circuit 212, and the third analog switch T21 transmits the second induction signal S2 to the first signal processing circuit 211.

The analog switches T13, T23, T31, T32, and T33 are further taken into consideration. The control circuit 22 may also control the analog switches T11, T12, and T13 to be selectively turned on, the analog switches T21, T22, and T23 to be selectively turned on, the analog switches T31, T32, and T33 to be selectively turned on, the analog switches T11, T21, and T31 to be selectively turned on, the analog switches T12, T22, and T32 to be selectively turned on, and the analog switches T13, T23, and T33 to be selectively turned on, so that the first induction signal S1 is transmitted to one of the first signal processing circuit 211, the second signal processing circuit 212, and the third signal processing circuit 213, the second induction signal S2 is transmitted to another one of the first signal processing circuit 211, the second signal processing circuit 212, and the third signal processing circuit 213, and the third induction signal S3 is transmitted to the other one of the first signal processing circuit 211, the second signal processing circuit 212, and the third signal processing circuit 213.

Figure 5:
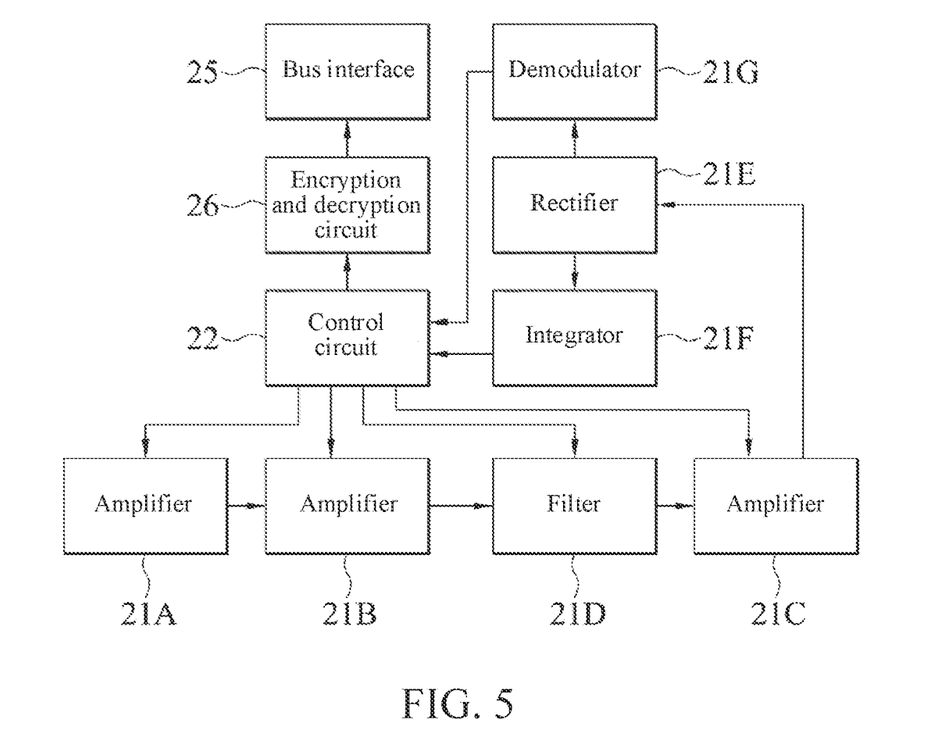
FIG. 5 is a block diagram of an embodiment of a signal processing circuit of the electromagnetic induction type coordinate positioning apparatus of FIG. 3.

In an embodiment, the signal processing procedure respectively performed by the signal processing circuits 211-218 on the induction signals S1-S8 includes an amplification procedure, a filtering procedure, a rectification procedure, an integration procedure, and a demodulation procedure. Referring to FIG. 5, each of the signal processing circuits 211-218 includes an amplifier 21A, an amplifier 21B, an amplifier 21C, a filter 21D, a rectifier 21E, an integrator 21F, and a demodulator 21G. Using the signal processing circuit 211 as an example, the amplifier 21A may receive the induction signal S1 from the induction coil 201 and amplifies the induction signal S1, the amplifier 21B then performs a second amplification procedure, the filter 21D, the amplifier 21C, the rectifier 21E, and the integrator 21F sequentially perform a filtering procedure, a third amplification procedure, a rectification procedure, and an integration procedure, and the demodulator 21G performs a demodulation procedure, to demodulate an output signal of the rectifier 21E and output a demodulated signal to the control circuit 22. Therefore, the signal processing circuit 211 outputs a signal P1 obtained after signal processing to the control circuit 22. The operation of the signal processing circuits 212-218 is the same as that of the signal processing circuit 211. The signal processing circuits 212-218 output signals P2-P8 obtained after signal processing to the control circuit 22. The control circuit 22 then calculates the coordinate information of the pointer device 1 according to the signals P1-P8 obtained after signal processing.

In an embodiment, the electromagnetic induction type coordinate positioning apparatus 2 further includes an encryption and decryption circuit 26 and a bus interface 25. The encryption and decryption circuit 26 is coupled between the bus interface 25 and the control circuit 22.

Figure 6:
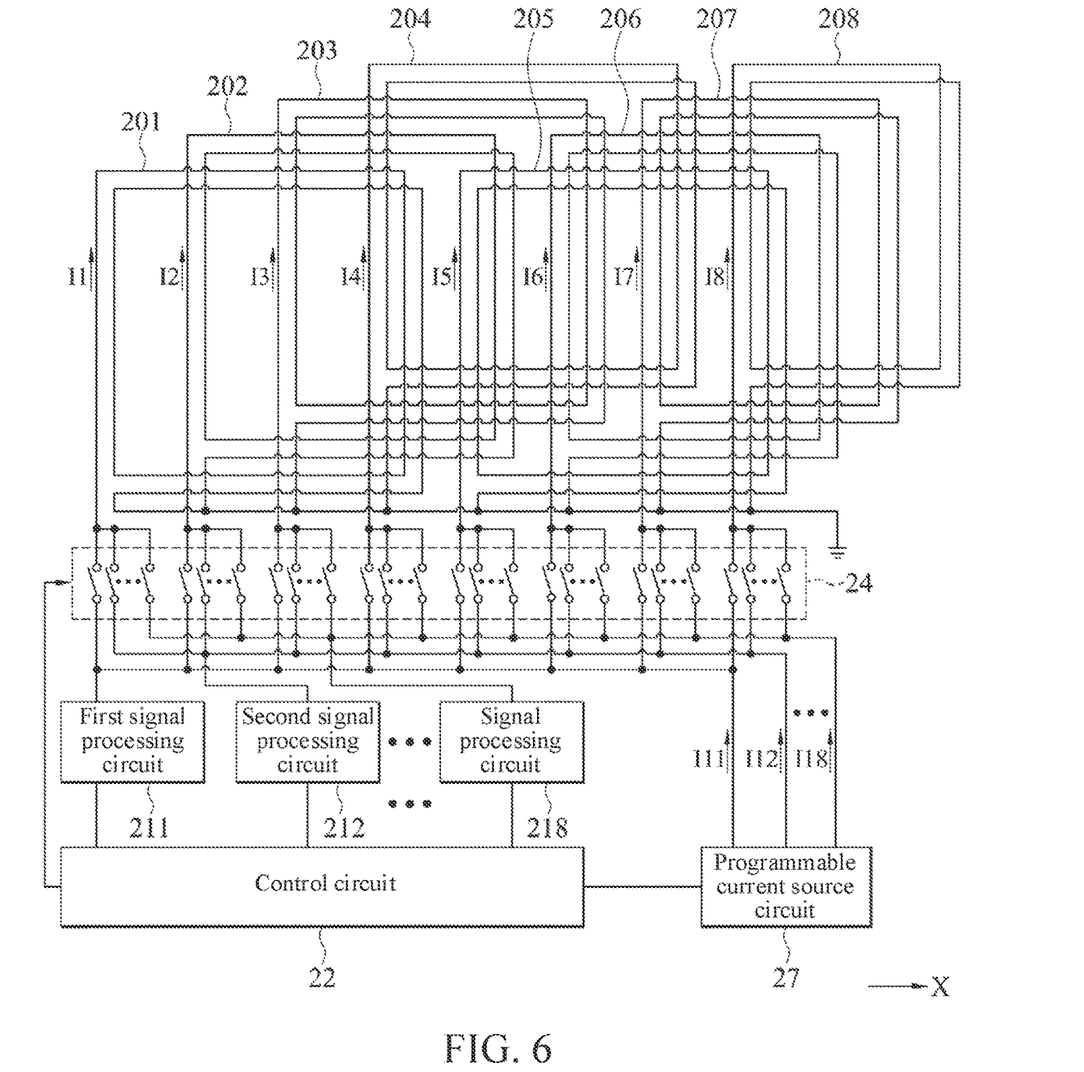
FIG. 6 is a circuit diagram of another embodiment of an electromagnetic induction type coordinate positioning apparatus.

In an embodiment, as for the electromagnetic induction type coordinate positioning apparatus 2, there are two working modes. One is electric energy to magnetic energy conversion mode and another is receiving mode. In the electric energy to magnetic energy conversion mode, the electromagnetic induction type coordinate positioning apparatus 2 may excite a magnetic field by using the induction coils 201-208 in which a current flows. And according to the theorem of electromagnetic resonance, when the pointer device 1 is in the adjacent space, it may harvest the energy by coupling the excitation magnetic field. Referring to FIG. 6, the electromagnetic induction type coordinate positioning apparatus 2 further includes a programmable current source circuit 27 coupled to the control circuit 22, and the programmable current source circuit 27 is coupled to each analog switch in the selection circuit 24. In the electric energy to magnetic energy conversion mode, the control circuit 22 may control each of the analog switches of the selection circuit 24, which connected to the same induction coil, to be turned on at the same time and synchronously, the control circuit 22 controls the programmable current source circuit 27 to respectively generate shunting signals I11-I18, the analog switches in the selection circuit 24 respectively receive the shunting signals I11-I18, and the analog switches turned on respectively and converge the shunting signals I11-I18 into one of the induction coils 201-208, so that the excitation current signals I1-I8 are sequentially flow on the induction coils 201-208, to excite an excitation magnetic field around the induction coils 201-208, so as to enable the pointer device 1 to harvest the energy.

Figure 7:
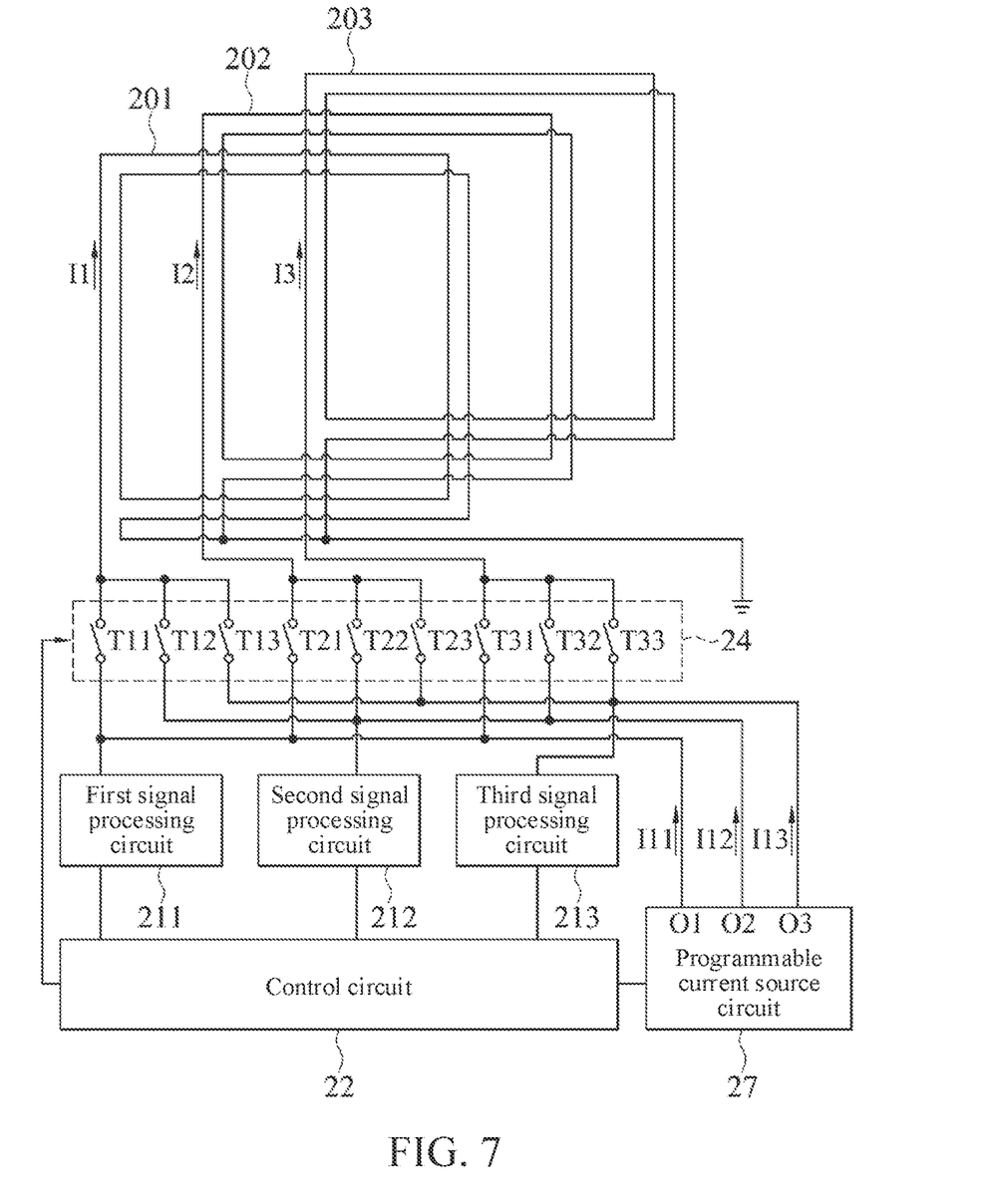
FIG. 7 is a part of circuit diagram of an embodiment of the electromagnetic induction type coordinate positioning apparatus of FIG. 6.

In particular, referring to FIG. 7, to offer the induction coils 201-203 as an example, the programmable current source circuit 27 is electrically connected to each of the analog switches T11-T13, T21-T23, and T31-T33. The programmable current source circuit 27 includes three outputs O1, O2, and O3. The output O1 is electrically connected to the analog switches T11, T21, and T31. The output O2 is electrically connected to the analog switches T12, T22, and T32. The output O3 is electrically connected to the analog switches T13, T23, and T33. In the electric energy to magnetic energy conversion mode, to prevent the induction coils 201-203 from mutual induction to affect the energy harvesting of the pointer device 1, the control circuit 22 controls analog switches electrically connected to one of the induction coils and turned the analog switches on at the same time. And the control circuit 22 sequentially controls the analog switches T11-T13, T21-T23, and T31-T33 electrically connected to the induction coils 201-203 and turned on, so that the excitation current signals I1, I2, and I3 are sequentially flow on the induction coils 201, 202, and 203.

For example, at a first time slot, the control circuit 22 may controls the analog switches T11-T13 to be turned on and the others analog switches T21-T23 and T31-T33 to be turned off. Then, at a second time slot, the control circuit 22 may control the analog switches T21-T23 to be turned on and the other analog switches T11-T13 and T31-T33 to be turned off. At a third time slot, the control circuit 22 controls the analog switches T31-T33 to be turned on and the other analog switches T11-T13 and T21-T23 to be turned off. In addition, the control circuit 22 controls the programmable current source circuit 27 to generate shunting signals I11, I12, and I13, and the shunting signals I11, I12, and I13 are respectively output through the three output O1, O2, and O3 of the programmable current source circuit 27. When the analog switches T11-T13 are turned on, the shunting signals I11, I12, and I13 respectively flow from the output O1, O2, and O3 to the analog switches T11, T12, T13. The shunting signals I11, I12, and I13 are respectively passed through the analog switches T11, T12, and T13 to the first induction coil 201, that is, the shunting signals I11, I12, and I13 are respectively exported from the analog switches T11, T12, and T13 into one terminal of the first induction coil 201, so that an excitation current signal I1 (hereinafter referred to as a first excitation current signal I1) is flowed on the first induction coil 201. The current of the first excitation current signal I1 is the sum of the current of the shunting signals I11, I12, and I13.

Similarly, when the analog switches T21-T23 are turned on, the shunting signals I11, I12, and I13 are respectively passed through the analog switches T21, T22, and T23 to the second induction coil 202, that is, the shunting signals I11, I12, and I13 are respectively exported from the analog switches T21, T22, and T23 into one terminal of the second induction coil 202, so that an excitation current signal I2 (hereinafter referred to as a second excitation current signal I2) is flowed on the second induction coil 202. The current of the second excitation current signal I2 is the sum of the current of the shunting signals I11, I12, and I13. Similarly, when the analog switches T31-T33 are turned on, the shunting signals I11, I12, and I13 are respectively passed through the analog switches T31, T32, and T33 to the third induction coil 203, that is, the shunting signals I11, I12, and I13 are respectively exported from the analog switches T31, T32, and T33 into one terminal of the third induction coil 203, so that an excitation current signal I3 (hereinafter referred to as a third excitation current signal I3) is flowed on the third induction coil 203. The current of the third excitation current signal I3 is the sum of the current of the shunting signals I11, I12, and I13.

Based on this, the shunting signals I11, I12, and I13 flow through three analog switches T11-T13, three analog switches T21-T23, or three analog switches T31-T33 before being flowed into the induction coil 201, the induction coil 202, or the induction coil 203. When the excitation current signals I1, I2, and I3 have large current values, as compared with the case where one analog switch flows a large current generated by the programmable current source circuit 27, using three analog switches T11-T13, T21-T23, or T31-T33 to shunt the large current can ensure that the current borne by each analog switch is not too large, that is, the current of the excitation current signals I1, I2, and I3 are distributed to the analog switches T11-T13, T21-T23, or T31-T33. And the current of the excitation current signals I1, I2, and I3 will not be limited by the current tolerance of the analog switch, and the programmable current source circuit 27 even may generate shunting signals I11, I12, and I13 with large current values, which are flowed into the induction coils 201-203 respectively to generate larger excitation current signals I1, I2, and I3, so as to enhance more electric energy to magnetic energy without being limited by the maximum current tolerance of the analog switch, thereby enhancing the energy harvesting efficiency of the pointer device 1.

It should be noted that FIG. 7 shows an example where the programmable current source circuit 27 generates same shunting signals I11, I12, and I13 which flow into the analog switches T11-T13, the analog switches T21-T23, or the analog switches T31-T33, but the present disclosure is not limited thereto. The programmable current source circuit 27 may also generate different shunting signals which respectively flow into the analog switches T11-T13, T21-T23, or T31-T33, so that the excitation current signals I1, I2, and I3 with different current are sequentially flowed on the induction coils 201-203. In addition, when the analog switches T11-T13, T21-T23, or T31-T33 are controlled to be turned on or off, the first time slot is earlier than the second time slot and the second time slot is earlier than the third time slot, or the second time slot is earlier than the first time slot and the first time slot is earlier than the third time slot. The rest can be deduced by analogy, so the details will not be described herein.

Figure 8:
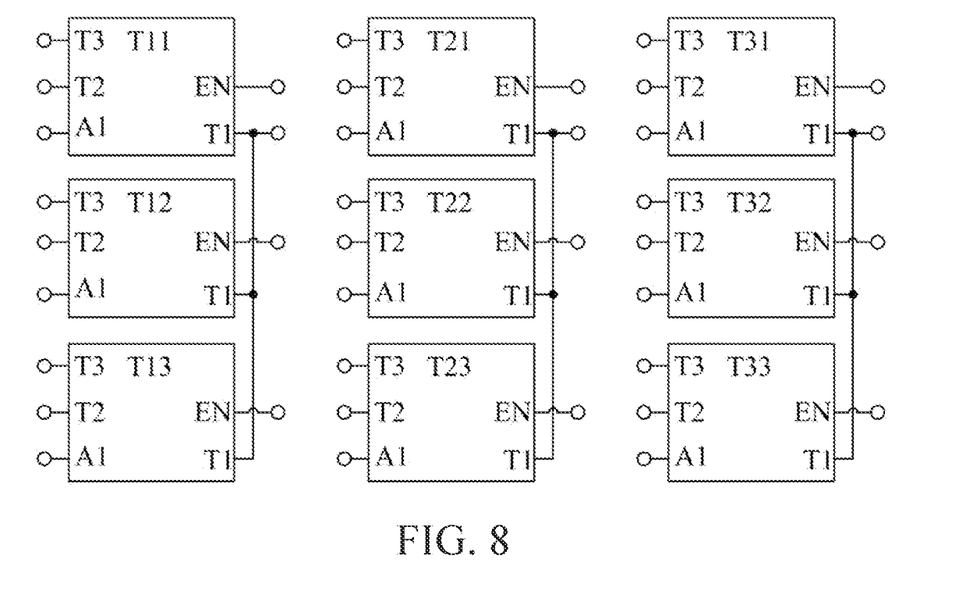
FIG. 8 is a circuit diagram of an embodiment of the analog switches in FIG. 4 and FIG. 7.

Referring to FIG. 8, FIG. 8 is a circuit diagram of an embodiment of the analog switches T11-T13, T21-T23, and T31-T33. Each of the analog switches T11-T13, T21-T23, and T31-T33 is designed with an enable pin EN, configured to determine whether the analog switch is enabled or disabled. Each of the analog switches T11-T13, T21-T23, and T31-T33 is designed with a control pin A1, a first pin T1, a second pin T2, and a third pin T3. The control pins A1 of the analog switches T11-T13, T21-T23, and T31-T33 are electrically connected to the control circuit 22. The first pins T1 of the analog switches T11-T13, T21-T23, and T31-T33 are respectively electrically connected to the induction coils 201-203, the second pins T2 of the analog switches T11-T13, T21-T23, and T31-T33 are respectively electrically connected to the signal processing circuits 211-213, and the third pins T3 of the analog switches T11-T13, T21-T23, and T31-T33 are respectively electrically connected to the programmable current source circuit 27. In other words, the analog switches T11-T13 are connected in parallel to each other, the analog switches T21-T23 are connected in parallel to each other, and the analog switches T31-T33 are connected in parallel to each other. In the receiving mode, the control circuit 22 may selectively control the analog switches T11-T13, T21-T23, and T31-T33 to be turned on or off by means of the control pins A1 of the analog switches T11-T13, T21-T23, and T31-T33 according to the first connection mode or the second connection mode. If the analog switches T11-13, T21-23, and T31-33 are turned on, the induction signals S1-S3 may respectively be input from the first pins T1 and output from the second pins T2 to the signal processing circuits 211-213.

In the electric energy to magnetic energy conversion mode, the control circuit 22 may control each of the analog switches T11-T13, T21-T23, and T31-T33 to be turned on by means of the control pins A1 of the analog switches T11-T13, T21-T23, and T31-T33. After the programmable current source circuit 27 generates the shunting signals I11, I12, and I13, when the analog switches T11-T13 are turned on, the shunting signals I11, I12, and I13 are respectively input through the third pins T3 of the analog switches T11-T13, and then the shunting signals I11, I12, and I13 are respectively output to the induction coil 201 through the first pins T1 of the analog switches T11-T13; or when the analog switches T21-T23 are turned on, the shunting signals I11, I12, and I13 are respectively input through the third pins T3 of the analog switches T21-T23, and then the shunting signals I11, I12, and I13 are respectively output to the induction coil 202 through the first pins T1 of the analog switches T21-T23; or when the analog switches T31-T33 are turned on, the shunting signals I11, I12, and I13 are respectively input through the third pins T3 of the analog switches T31-T33, and then the shunting signals I11, I12, and I13 are respectively output to the induction coil 203 through the first pins T1 of the analog switches T31-T33.

In an embodiment, the electromagnetic induction type coordinate positioning apparatus 2 communicates with the pointer device 1 at one of a plurality of predefined operating frequencies in the foregoing receiving mode. When communicating with the pointer device 1, the electromagnetic induction type coordinate positioning apparatus 2 receives an electromagnetic signal from the pointer device 1 by means of any one of the induction coils 201-208. To make sure that the electromagnetic induction type coordinate positioning apparatus 2 may communicate with the pointer device 1 correctly, the control circuit 22 have to verify whether the electromagnetic signal is stable when in operation. The control circuit 22 has to detect the voltage level of the electromagnetic signal, and determine whether the voltage level of the electromagnetic signal is within a predefined critical range. For example, the predefined critical range may be a range of ±5% of the predefined voltage value. When the voltage level of the electromagnetic signal does not fall within the predefined critical range, indicating that the electromagnetic signal is interfered by noise, the control circuit 22 controls the electromagnetic induction type coordinate positioning apparatus 2 to communicate with the pointer device 1 at another one of the plurality of predefined operating frequencies, until the voltage level falls within the predefined critical range.

For example, the designer of the electromagnetic induction type coordinate positioning apparatus 2 may determine in advance an interference band susceptible to interference from noise and select a plurality of operating frequencies suitable for use by the electromagnetic induction type coordinate positioning apparatus 2 to communicate with the pointer device 1 as predefined operating frequencies. For example, the designer may select 500 KHz, 750 KHz, and 1 MHz as three operating frequencies, and by default, the conventional electromagnetic induction type coordinate positioning apparatus 2 may communicate with the pointer device 1 at one of the predefined operating frequencies, for example, at 500 KHz. When the control circuit 22 determines that the electromagnetic signal received by the electromagnetic induction type coordinate positioning apparatus 2 when communicating with the pointer device 1 at 500 KHz is not stable, the control circuit 22 may control the electromagnetic induction type coordinate positioning apparatus 2 to switch to an operating frequency of 750 KHz or 1 MHz. The control circuit 22 then determines whether the electromagnetic signal received from the pointer device 1 is stable, and accordingly determine whether to switch the operating frequency of the electromagnetic induction type coordinate positioning apparatus 2. The above operations are repeated until the electromagnetic signal received from the pointer device 1 is stable.

Based on the above, according to an embodiment of the electromagnetic induction type coordinate positioning apparatus of the present disclosure, the use of a plurality of induction coils to synchronously be coupled of the position signals of the pointer device can improve the report rate of the position information of the pointer device, and the position information of the pointer device calculated by a plurality of induction signals generated at the same time by a plurality of induction coils will be higher accuracy. In addition, the present disclosure can extend the current limitation of the analog switch and increase the excitation current flowing to the induction coil, so as to more efficiently convert electric energy to magnetic energy, thereby improving the energy harvesting efficiency of the pointer device. Further, the electromagnetic induction type coordinate positioning apparatus of the present disclosure can flexibly switch between operating frequencies to avoid the interference band susceptible to interference from noise, thereby improving the overall system performance.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electromagnetic induction type coordinate positioning apparatus, adapted for a pointer device, the electromagnetic induction type coordinate positioning apparatus comprising:
　　a first induction coil, configured to be inducted a first induction signal when a pointer device comes close;
　　a second induction coil, arranged in an interlaced arrangement with respective to the first induction coil along an axial direction, and configured to be inducted a second induction signal when the pointer device comes close;

a first signal processing circuit, coupled to the first induction coil and the second induction coil, and configured to electrically connect to one of the first induction coil and the second induction coil, to perform a first signal processing procedure on one of the first induction signal and the second induction signal;

a second signal processing circuit, coupled to the first induction coil and the second induction coil, and configured to, when the first signal processing circuit is electrically connected to one of the first induction coil and the second induction coil, electrically connect to the other one of the first induction coil and the second induction coil, to perform a second signal processing procedure on the other one of the first induction signal and the second induction signal; and a control circuit, coupled to the first signal processing circuit and the second signal processing circuit, and configured to calculate position information of the pointer device according to the first induction signal and the second induction signal that have been respectively processed by the first signal processing procedure and the second signal processing procedure.

2. The electromagnetic induction type coordinate positioning apparatus according to claim 1, further comprising:

a first analog switch, coupled between the first induction coil and the first signal processing circuit, and controlled by the control circuit;

a second analog switch, coupled between the first induction coil and the second signal processing circuit, and controlled by the control circuit;

a third analog switch, coupled between the second induction coil and the first signal processing circuit, and controlled by the control circuit; and a fourth analog switch, coupled between the second induction coil and the second signal processing circuit, and controlled by the control circuit, wherein the first analog switch and the second analog switch are selectively turned on, the third analog switch and the fourth analog switch are selectively turned on, the first analog switch and the third analog switch are selectively turned on, and the second analog switch and the fourth analog switch are selectively turned on, so that the first signal processing circuit receives one of the first induction signal and the second induction signal, and the second signal processing circuit receives the other one of the first induction signal and the second induction signal.

3. The electromagnetic induction type coordinate positioning apparatus according to claim 2, wherein in a receiving mode of the electromagnetic induction type coordinate positioning apparatus, the control circuit controls the first analog switch and the second analog switch to be selectively turned on, controls the third analog switch and the fourth analog switch to be selectively turned on, controls the first analog switch and the third analog switch to be selectively turned on, and controls the second analog switch and the fourth analog switch to be selectively turned on.

4. The electromagnetic induction type coordinate positioning apparatus according to claim 3, further comprising: a programmable current source circuit coupled to the first analog switch, the second analog switch, the third analog switch, and the fourth analog switch, and coupled to the control circuit, wherein in an electric energy to magnetic energy conversion mode of the electromagnetic induction type coordinate positioning apparatus, at a first time point, the control circuit controls the first analog switch and the second analog switch to be turned on and controls the third analog switch and the fourth analog switch to be turned off, and at a second time slot, the control circuit controls the third analog switch and the fourth analog switch to be turned on and controls the first analog switch and the second analog switch to be turned off; the control circuit controls the programmable current source circuit to generate two shunting signals; when the first analog switch and the second analog switch are turned on, the two shunting signals are respectively converged into one terminal of the first induction coil through the first analog switch and the second analog switch; and when the third analog switch and the fourth analog switch are turned on, the two shunting signals are respectively converged into one terminal of the second induction coil through the third analog switch and the fourth analog switch.

5. The electromagnetic induction type coordinate positioning apparatus according to claim 4, wherein the programmable current source circuit comprises a first output and a second output, the first output is coupled to the first analog switch and the third analog switch, the second output is coupled to the second analog switch and the fourth analog switch, and the programmable current source circuit respectively outputs the two shunting signals through the first output and the second output.

6. The electromagnetic induction type coordinate positioning apparatus according to claim 4, wherein after being converted to the first induction coil, the two shunting signals form a first excitation current signal on the first induction coil; after being converted to the second induction coil, the two shunting signals form a second excitation current signal on the second induction coil; and the pointer device stores energy according to the first excitation current signal and the second excitation current signal.

7. The electromagnetic induction type coordinate positioning apparatus according to claim 1, wherein the first signal processing circuit and the second signal processing circuit each comprise an amplifier, a filter, a rectifier, an integrator, and a demodulator.

8. The electromagnetic induction type coordinate positioning apparatus according to claim 1, wherein the electromagnetic induction type coordinate positioning apparatus communicates with the pointer device at one of a plurality of predefined operating frequencies, the electromagnetic induction type coordinate positioning apparatus receives an electromagnetic signal from the pointer device by means of any one of the first induction coil and the second induction coil when communicating with the pointer device, the control circuit further determines whether a voltage level of the electromagnetic signal falls within a predefined critical range, and when the voltage level does not fall within the predefined critical range, the control circuit controls the electromagnetic induction type coordinate positioning apparatus to communicate with the pointer device at another one of the plurality of predefined operating frequencies.

9. The electromagnetic induction type coordinate positioning apparatus according to claim 8, wherein when the voltage level does not fall within the predefined critical range, the control circuit controls the electromagnetic induction type coordinate positioning apparatus to communicate with the pointer device at another one of the plurality of predefined operating frequencies, until the voltage level falls within the predefined critical range.

10. The electromagnetic induction type coordinate positioning apparatus according to claim 1, further comprising a selection circuit coupled between the first induction coil and the first signal processing circuit, and coupled between the second induction coil and the second signal processing circuit, wherein the selection circuit is configured to electrically connect the first signal processing circuit to one of the first induction coil and the second induction coil, and electrically connect the second signal processing circuit to the other one of the first induction coil and the second induction coil.

\* \* \* \* \*